April 24, 1951  J. H. STANSBURY  2,550,615
METHOD OF AND APPARATUS FOR FREEZING FOODS
Filed July 10, 1946  2 Sheets-Sheet 2

Inventor
John H. Stansbury,
by
Stone, Boyden & Mack.
Attorneys.

Patented Apr. 24, 1951

2,550,615

UNITED STATES PATENT OFFICE 2,550,615

METHOD OF AND APPARATUS FOR FREEZING FOODS

John H. Stansbury, Dillon, S. C., assignor to Stansbury, Inc., Baltimore, Md., a corporation of Maryland Application July 10, 1946, Serial No. 682,468

17 Claims. (Cl. 62—104)

This invention relates to the freezing of foods to preserve the same and more particularly to freezing by what is known as the immersion method.

Among the objects of the invention are to provide means by which the freezing liquid is used effectively and economically; to device an arrangement in which the food to be frozen in the form of small pieces or units is first mixed with the freezing liquid which serves as a vehicle and the mixture is then pumped through a conduit surrounded by a refrigerating medium, so that when the mixture emerges from such conduit, the food is hard frozen; to provide improved apparatus for refrigerating the liquid vehicle and the conduit through which the mixture of liquid and food travels; to devise an improved method of and means for removing the excess liquid from the frozen food and returning it to the chamber in which the liquid is mixed with the food; and to devise an improved method for "glazing" the frozen food.

In order that the invention may be readily understood, reference is had to the accompanying drawings, forming part of this specification, and in which.

Figure 1:
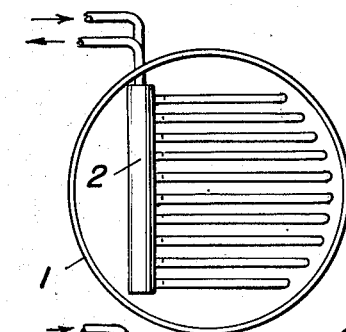
Fig. 1 is a diagrammatic plan view of one embodiment of the invention showing apparatus by means of which my improved method can be carried out.
Figure 1:
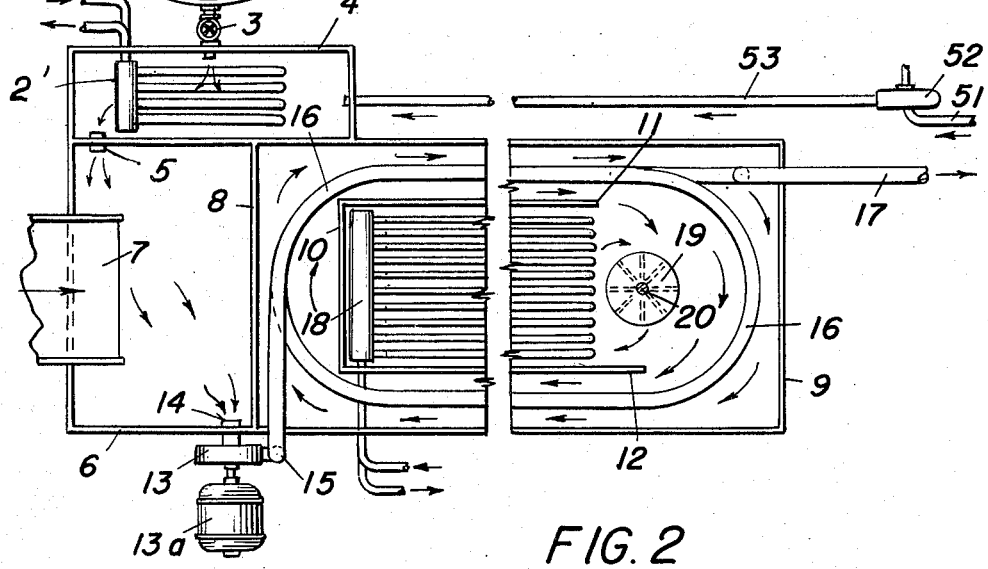
Figure 2:
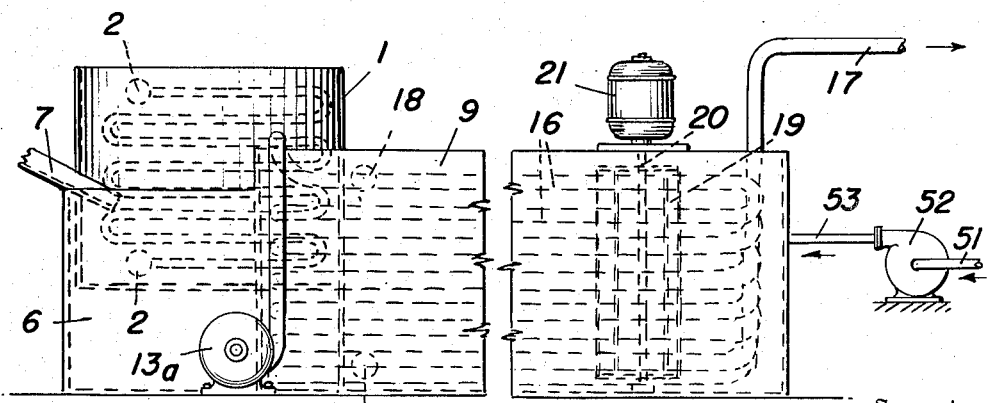
Fig. 2 is a side elevation thereof.

Referring to the drawings in detail, and more particularly first to Figs. 1 and 2 thereof, I have shown, at 1, an open tank in which the freezing liquid is contained, this tank having mounted therein a set of refrigerating coils 2 through which ammonia or other refrigerating agent is caused to circulate. Thus, the liquid in the tank 1 is subjected to a preliminary cooling and chilling treatment before it is delivered to the freezing apparatus. This liquid vehicle may be of any suitable character, such as sugar syrups, brine or glycerine and must, of course, have a freezing point lower than that of the food being frozen.

The liquid is delivered through a valve 3 to a receiving tank 4, having a refrigerating coil 2' therein, and this tank, in turn, communicates through a port 5 with a mixing tank 6. The food products to be frozen are delivered by a chute 7 into this mixing tank 6, the amount of food being properly proportioned to the amount of liquid vehicle in the tank in such manner that the food is distributed through out the liquid and is suspended therein, so as to form a fluid mixture.

The mixing chamber 6 is shown as having a wall 8 in common with a relatively large freezing chamber or tank 9. The latter may be filled with brine or a solution of calcium chloride or other suitable refrigerating medium, which refrigerating medium is maintained at a very low temperature, such as 5° below zero F. by means of suitable ammonia coils or the like 18.

These ammonia coils are located centrally of the freezing tank or chamber 9 and are spaced both from the side and end walls thereof. The coils are surrounded and enclosed on three sides by partitions 10, 11 and 12, one of these partitions, such as 12, projecting longitudinally somewhat beyond the ends of the refrigerating coils, as shown in Fig. 1.

Wholly outside of the tank or chambers, I mount a centrifugal pump 13, driven by a motor 13ª and having its intake conduit 14 communicating with the mixing chamber 6. Both the pump and said intake conduit are located at a point near the bottom of the mixing chamber, as shown in Fig. 2. The liquid entering this chamber through the port 5 creates a current moving toward the pump intake 14, as shown by the arrows in Fig. 1. Thus the fluid mixture of liquid and foods tends to flow directly into the pump intake. The pump 13 is provided with a delivery conduit 15, shown as extending vertically up over the upper edge of the freezing tank or chamber 9, where it connects with one end of a relatively long tubular conduit 16, arranged in the form of a coil having substantially horizontal convolutions disposed one above the other.

This coiled conduit, which is preferably several inches in diameter, is disposed within the tank 9 and lies in the space between the partitions 10, 11 and 12 and the side and end walls of the tank. In other words, this coiled conduit completely surrounds the refrigerating coils 18.

Also disposed within the convolutions of the coiled conduit, adjacent the ends of the refrigerating coils where there is no partition, is an agitator shown as a paddle wheel 19, mounted on a vertically extending shaft 20, having, at its upper end, a motor 21 by which it is driven. This motor is omitted from Fig. 1 for the sake of clearness.

It will be observed that, as the paddle wheel 19 revolves, it will tend to set up currents in the brine or other refrigerating medium in the tank, as indicated by the arrows in Fig. 1, thus causing the refrigerating medium to circulate freely around the tank. The projecting end of the partition 12 serves as a baffle to deflect a portion of the refrigerating medium through the spaces between the refrigerating coils 16, while other portions of the medium flow between the partition 12 and the side wall of the tank, and thence around the spaces between the partitions 10 and 11 and the end and other side wall of the tank, thus circulating freely about the entire length of the coiled conduit 16. By this means, the refrigerating medium is kept at an extremely low temperature throughout the tank, and consequently the coiled conduit 16 is maintained at a temperature well below the freezing point of the food products to be frozen.

The operation of my improved apparatus as so far described will be apparent. The mixture of the liquid vehicle and food product in the tank 6 is drawn therefrom by the pump 13 and forced, under pressure by such pump, into and through the coiled conduit 16. During its passage through this conduit, which is completely surrounded by the refrigerating medium at a very low temperature, the liquid vehicle and food units which it contains are chilled to a temperature well below the freezing point of such food units, but not of the liquid, so that, when the fluid mixture emerges from the delivery end 17 of the coiled conduit, the food products are hard frozen. It will be noted that the mixture of the liquid vehicle and food traverses a relatively great length of coiled conduit surrounded by the refrigerating medium. As a result of this, the mixture can be forced through such conduit at relatively high speed, and the food will be thorougly and quickly frozen. By reason of the rapid travel of the food products through the coiled conduit, the capacity of the apparatus is relatively great as compared with the amount of floor space occupied.

Also, it will be observed that only a relatively small proportion of the liquid vehicle contained in the storage tank 1 is delivered into the mixing chamber 6, at any one time. When sufficient liquid has been allowed to flow into this chamber, the valve 3 is closed, thus reserving an uncontaminated supply of liquid in the tank 1 for future use. Meanwhile, the liquid vehicle which travels through the coiled conduit with the food is separated and returned to the refrigerated receiving tank 4, to be used again, by means now to be described.

Figure 3:
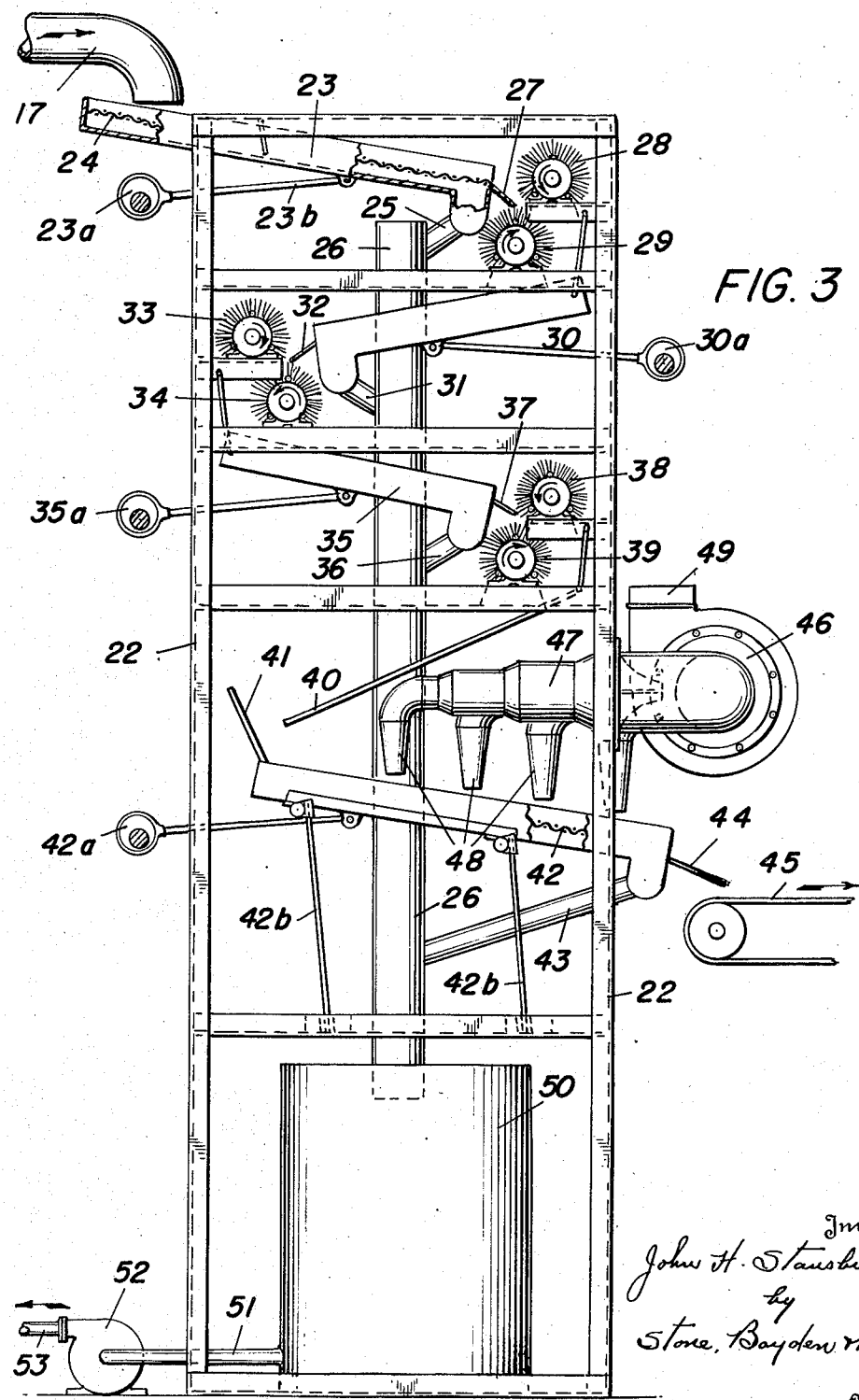
Fig. 3 is a diagrammatic side elevation on an enlarged scale showing my improved apparatus for removing excess freezing liquid from the frozen food, and for "glazing" the food.

Referring to Fig. 3, it will be seen that I provide a frame 22, at the top of which is movably supported an inclined pan 23, adapted to be vibrated by means of an eccentric 23a and connecting rod 23b. Extending across this pan above the bottom thereof is a screen 24, having, at its lower edge, a delivery chute 27. From the lower end of the pan 23, extends a flexible connection 25, to a vertically disposed conduit or header 26, extending down through the center of the frame 22.

Adjacent the chute 27 is a pair of rotating cylindrical brushes 28 and 29, driven (by means not shown), in the direction indicated by the arrows. The bristles of these brushes are made of some relatively soft and flexible material such as Tampico fiber. The action of centrifugal force on these soft bristles tends to hold them, even when wet, in operative radial position.

Below the brushes 28 and 29 is a second inclined pan and screen 30, vibrated by means of an eccentric 30a, connected by a conduit 31 with the header 26. This has, at its lower end, a chute 32, by which the fruit is discharged into a second pair of rotary brushes 33, 34.

Below the brushes 33, 34 is still another inclined screen and pan 35, vibrated by means of an eccentric 35a, and having a conduit 36 connected with the header 26. A chute 37 delivers from the lower end of the screen into the bite of a third pair of rotary brushes 38, 39.

Below these brushes extends an inclined chute 40, which delivers into an inclined screen 42, having at its upper end a guide baffle 41, and at its lower end a discharge chute 44 arranged to deliver the frozen food onto a travelling conveyor 45 or the like. The screen 42 is supported on arms 42b and is vibrated by means of an eccentric 42a.

Mounted on the frame 22 is a centrifugal fan 46, having an intake manifold 47, from which extend downwardly a plurality of suction nozzles 48, disposed above and in close proximity to the screen 42. It will be understood that the screen 42 has no bottom or pan beneath it, but is entirely open and unobstructed so that air may be drawn up through the same into the nozzles 48, and be discharged at 49.

Beneath the lower end of the header 26 is disposed a tank 50 for receiving the excess liquid, and from this tank extends a pipe 51, to a suitable pump 52, which delivers through a pipe 53 into the receiving tank 4.

From the foregoing, it will be understood that the mixture of frozen fruit and liquid vehicle, delivered from the end of the conduit 17, falls upon the vibrating screen 24, through which the liquid drains into the pan 23, and flows, by gravity, through the connection 25 into the header 26. The frozen food products are delivered, by the chute 27, into the bite of the rotating brushes 28, 29, and these serve to positively brush off and remove, from the pieces of food, any excess liquid which may be clinging to them. This liquid flows down into the pan 30, and thence through the connection 31 into the header 26, while the food units travel along the screen within the pan 30, and are delivered from the chute 32 into the second pair of rotating brushes 33, 34. Here, additional liquid which is still clinging to the food units is removed. Similarly, the food may be led over still other screens and between still other pairs of rotating brushes, three such pairs being illustrated in the drawing.

Heretofore, the method commonly employed for removing excess liquid from frozen food has been by means of centrifuges. By my improved method, above described, not only am I able to reduce the residual liquid to a very much smaller percentage than is possible with the use of centrifuges, but the invention provides a continuous, as distinguished from a batch process, thus resulting in a more efficient and economical operation.

After leaving the third set of brushes 38, 39, the frozen food travels down the chute 40 and is there exposed to the surrounding air. Finally, the frozen food passes in a thin stream along the vibrating screen 42, where it is traversed by strong air currents drawn up through the screen by the suction nozzles 48.

If, as is usual, the packing of the frozen foods is carried out in the summer, the air in the packing plant is relatively warm and humid, and contains sufficient moisture so that, when it comes in contact with the frozen food, this moisture condenses on the food and freezes, thus forming a thin film of ice over each piece of food. This serves to exclude the air, during storage of the foods, and is commonly known as "glazing."

The usual method of "glazing," as heretofore practiced, has been to sprinkle the frozen food with a fine spray of water. My improved method, however, comprising subjecting the food to the action of moist or humid air, produces superior and more uniform results.

In the event that the surrounding air is too cool and dry, as in winter, the necessary moisture may be added by means of suitable air conditioning apparatus.

The liquid vehicle returned to the receiving tank 4 through the pipe 53, is mixed with the liquid already in this tank. Here, any food particles or other foreign matter contained in the liquid, settles to the bottom. The liquid is kept thoroughly chilled by the refrigerating coils 2', and is fed back, at a low temperature, into the mixing chamber 6. As the operation proceeds, additional fresh chilled liquid may be admitted from time to time, as required, through the valve 3 from the storage tank 1.

It will be particularly noted that the liquid vehicle, separated from the frozen food, is returned directly to the refrigerating tank 4, where impurities settle out and where its temperature is lowered to the required degree, and is then passed slowly, through the port 5, into the mixing tank, to be used over again. Since only enough liquid is employed in this tank to produce a fluid mixture of liquid and fruit, and since this relatively small amount of liquid is constantly re-chilled and re-cycled through the apparatus, comparatively little liquid, per pound of food frozen, is contaminated, and the system is exceptionally economical in its use of liquid.

What I claim is:

1. The method of freezing foods which comprises mixing the foods with a liquid vehicle, causing the fluid mixture to travel in the form of a continuously advancing, free flowing stream through a relatively long conduit having an open unobstructed interior throughout its length, and maintaining said conduit at a temperature below the freezing point of the food.

2. The method of freezing foods which comprises mixing the foods with a liquid vehicle having a freezing point lower than that of the food, and causing the fluid mixture of food and liquid to flow freely and rapidly through a conduit having an entirely open, unobstructed interior, throughout its length, and refrigerated to a temperature below the freezing point of the foods but not of the liquid.

3. The method of freezing foods which comprises mixing the foods with a liquid vehicle having a freezing point lower than that of the food, and causing the fluid mixture of food and liquid to flow at high velocity through a relatively long conduit in the form of a coil having a plurality of convolutions, said conduit having an entirely open, unobstructed interior and refrigerated to a temperature below the freezing point of the foods but not of the liquid.

4. The method of freezing foods which comprises mixing the foods with a liquid vehicle having a freezing point lower than that of the food and continuously delivering the fluid mixture under pressure into one end of a conduit having an entirely open, unobstructed interior and disposed in heat exchange relation with a refrigerating medium chilled to a temperature below the freezing point of the foods but not of the liquid vehicle.

5. The method of immersion freezing which comprises delivering the food to be frozen in loose condition into a tank containing a sufficient quantity of a chilled liquid vehicle to form a fluid mixture, continuously pumping from said tank the fluid mixture of food and liquid, and delivering such mixture under pressure to one end of a conduit having an entirely open, unobstructed interior and disposed in heat exchange relation with a refrigerating medium.

6. The method of immersion freezing which comprises delivering the food to be frozen in loose condition into a tank containing a sufficient quantity of a chilled liquid vehicle to form a fluid mixture, centrifugally impelling the fluid mixture of food and liquid from said tank upwardly and along a confined path in the form of a free flowing, continuous stream, in heat exchange relation with a refrigerating medium.

7. The method of freezing foods which comprises mixing the foods with a liquid vehicle having a freezing point lower than that of the food, and centrifugally impelling the mixture of food and liquid in the form of a free flowing, continuous stream at high velocity along a confined path in heat exchange relation with a refrigerating medium chilled to a temperature below the freezing point of the foods but not of the liquid vehicle.

8. The method of freezing foods which comprises immersing a body of liquid vehicle having a freezing point lower than that of the foods, pumping the mixture of food and liquid vehicle through refrigerating apparatus to freeze the food, separating out the excess liquid, and subjecting the food while frozen to a brushing operation to remove the liquid vehicle adhering thereto.

9. The method of freezing foods which comprises immersing them in a body of liquid vehicle having a freezing point lower than that of the foods, forcing the mixture of food and liquid vehicle through refrigerating apparatus to freeze the food, delivering the mixture of frozen food and liquid vehicle from said apparatus in a stream on to a screen, agitating the food on the screen to separate out the excess liquid, returning the excess liquid to the refrigerating apparatus, and subjecting the frozen food discharged from the screen to a brushing operation to remove the liquid vehicle adhering thereto.

10. Apparatus for freezing foods comprising a chamber adapted to contain a mixture of food and a liquid vehicle, a tank containing a liquid refrigerating medium chilled to a point below that at which the foods freeze, a coiled tubular conduit within said tank immersed in said refrigerating medium, and a centrifugal pump outside of said conduit and connected to one end thereof and to said chamber for forcing the foods to be frozen from said chamber through said conduit.

11. Food freezing apparatus comprising an open tank, refrigerating coils within said tank, a coiled tubular conduit also within said tank surrounding said refrigerating coils and spaced therefrom, a refrigerating medium in said tank and in which said coils and conduit are immersed, and means for causing a fluid mixture of the food to be frozen and a liquid vehicle to flow through said conduit.

12. Food freezing apparatus comprising a refrigerating tank having means for chilling a liquid vehicle, a relatively small receiving chamber into which such liquid vehicle is delivered from said tank, a mixing chamber communicating with said receiving chamber and into which the food to be frozen is delivered, a tubular conduit surrounded by a refrigerating medium, and means wholly outside of said mixing chamber for withdrawing therefrom the mixture of food and freezing liquid and forcing such mixture through said conduit.

13. Food freezing apparatus comprising an open tank, refrigerating coils within the central portion of said tank and spaced from the sides and ends thereof, a coiled tubular conduit within said tank surrounding said refrigerating coils and spaced therefrom, a refrigerating medium in said tank and in which said coils and conduit are immersed, and means for causing the food to be frozen to flow through said conduit.

14. Food freezing apparatus comprising an open tank, refrigerating coils within the central portion of said tank and spaced from the sides and ends thereof, a coiled tubular conduit within said tank surrounding said refrigerating coils and spaced therefrom, an enclosure surrounding said refrigerating coils on three sides, a refrigerating medium in said tank and in which said coils and conduit are immersed, means adjacent the open side of said enclosure for causing the refrigerating medium to circulate, and means for causing the food to be frozen to flow through said conduit.

15. Food freezing apparatus comprising a storage tank for liquid, a relatively small refrigerated receiving and settling tank, a valve controlled connection between said tank and chamber through which liquid may be supplied to the latter, a mixing chamber communicating with said receiving chamber and into which the food to be frozen is fed, a tubular conduit surrounded by a refrigerating medium, means for forcing the mixture of liquid and food from said mixing chamber through said conduit, means for separating the liquid from the frozen food issuing from said conduit, and means for delivering the separated liquid into said refrigerated and settling tank.

16. Apparatus for removing excess liquid from food frozen by the immersion process which comprises an inclined pan, a screen inside of said pan and rigid therewith, means for delivering the mixture of liquid and frozen food onto the upper end of said screen, means for agitating said screen and pan to cause the frozen food to travel toward the lower end thereof, whereby the excess liquid is separated from the food, and means whereby such excess liquid is discharged from said pan.

17. Apparatus for freezing foods comprising means for forming a mixture of the foods with a liquid vehicle, means for causing such mixture to travel along a path in heat exchange relation with a refrigerating medium, means for separating the frozen food from the excess liquid vehicle with which it was mixed, a pair of rotary brushes, and means for causing the frozen food discharged from said separating means to pass in the form of a continuous stream between said brushes, to remove the liquid vehicle adhering to the food.

JOHN H. STANSBURY.

REFERENCES CITED

The following references are of record in the file of this patent:

UNITED STATES PATENTS

| Number | Name | Date |
| --- | --- | --- |
| 151,419 | Murphy | May 26, 1874 |
| 1,773,912 | Light | Aug. 26, 1930 |
| 1,985,043 | Laporte | Dec. 18, 1934 |
| 2,013,025 | Bottoms | Sept. 3, 1935 |
| 2,057,366 | Chapman | Oct. 13, 1936 |
| 2,118,796 | Orrison | May 24, 1938 |
| 2,146,058 | Doyle | Feb. 7, 1939 |
| 2,159,047 | Paxton et al. | May 23, 1939 |
| 2,162,213 | Conn | June 13, 1939 |
| 2,197,457 | Werk et al. | Apr. 16, 1940 |
| 2,200,331 | Fisher | May 14, 1940 |
| 2,223,972 | Sterling | Dec. 3, 1940 |
| 2,237,255 | Finnegan | Apr. 1, 1941 |
| 2,263,452 | Birdseye | Nov. 18, 1941 |
| 2,280,434 | Huber | Apr. 21, 1942 |
| 2,316,845 | Craft | Apr. 20, 1943 |
| 2,329,333 | Carter | Sept. 14, 1943 |
| 2,418,746 | Bartlett et al. | Apr. 8, 1947 |
| 2,427,368 | Mayne | Aug. 26, 1947 |

OTHER REFERENCES

Ser. No. 255,603, Rastelli (A. P. C.), published June 12, 1943.